W. E. BOULGER.
Rendering Apparatus.
No. 28,960.
Patented July 3, 1860.
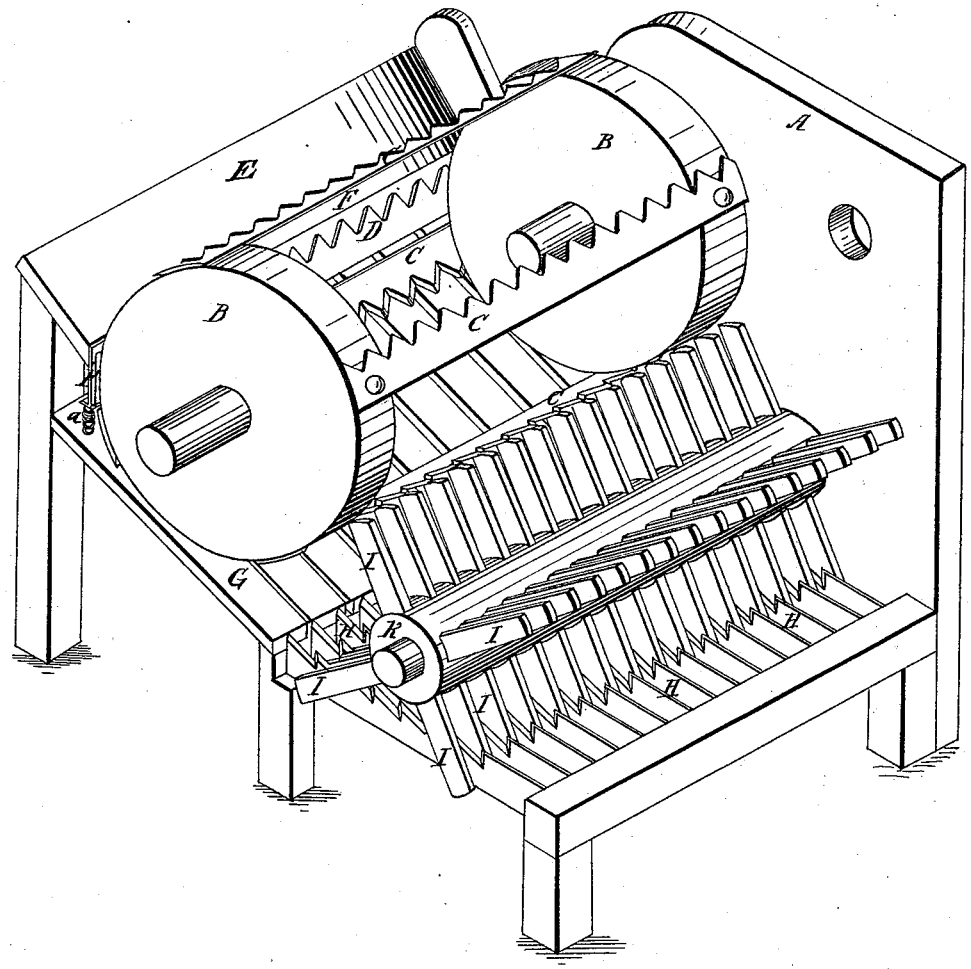
Witnesses:
John W. Clute
Chas L. Hughes
Inventor:
Knight Brothers Atty,
For William E. Boulger

UNITED STATES PATENT OFFICE.

WILLIAM E. BOULGER, OF JANESVILLE, WISCONSIN.

IMPROVEMENT IN MACHINES FOR CUTTING FAT.

Specification forming part of Letters Patent No. 28,960, dated July 3, 1860.

*To all whom it may concern:*

Be it known that I, WILLIAM E. BOULGER, of Janesville, Rock county, Wisconsin, have invented a new and useful Machine for Cutting Fat Preparatory to Rendering, &c.; and I do hereby declare the following to be a full, clear, and exact description thereof, reference being had to the accompanying drawing, making part of this specification.

My invention consists in a series of peculiarly-shaped knives, rotary and stationary, arranged to work in such a manner that they may cut the fat into the smallest required pieces with great rapidity and without becoming clogged with fat.

A perspective view of the machine is represented in the accompanying drawing.

A is the frame of the machine, the front side being removed in order that the interior construction may be clearly exhibited.

B is a knife-frame made to rotate in suitable journals in the frame and provided with knives C, serrated, as shown, and chamfered on the inner edge.

D is a stationary knife on which the fat is cut by the rotation of knives C. Its cutting-edge is shaped similarly to knives C, and it is adjusted in the frame so that the rotary knives work nearly in contact with its tooth opposite tooth. The fat is fed to these knives by chute E.

F is a plate fitted to slide vertically between knife D and chute E. It rests upon springs a, their tendency being to keep it in the position shown. This plate when the knives are cutting is forced down, as the fat before being completely separated has to reach the bottom of the serrations of knife D. After the passage of each knife the plate by the action of its springs will in returning to its position raise the body of the fat up, so that it can be moved forward again over the knife D for further cutting action. The knives C and D, by their peculiar shape, hold the fat till completely separated, preventing its slipping away, as with straight knives, and they also more readily enter and cut their way through the fat. The fat, after being cut by knives C and D into strips, is carried forward by its own gravity along the chute G (which may be of any suitable incline) to the series of knives H, and by the action of the revolving arms I of beater K, arranged to work in the position shown, is forced through the knife-grating H and thus cut into small pieces and deposited on the floor. The beater K is placed and rotated in such relation to the knife-frame B as that the ends of its arms I may pass nearly in contact with the faces of knives C, for the purpose of ridding said knives of clogged fat, said fat being in turn removed from the arms I by the knife-grating H.

This machine is not confined to cutting fat, but may be used for other purposes, cutting vegetables, roots, &c.

I do not claim, broadly, the use of serrated knives in machines for cutting fat and other substances.

I claim as new and of my invention—

1. The combination of the rotary serrated knives C and stationary knife D, constructed and arranged substantially as and for the purposes explained.

2. The arrangement of the beater I K in the described relation to the rotary knives C and stationary knives H, acting to recut the fat and also preserve the knives C from clogging, as set forth.

3. The vertical sliding plate F and springs a, in combination with the knife D, substantially as and for the purposes set forth.

In testimony of which invention I hereunto set my hand.

WM. E. BOULGER.

Witnesses:
GEO. H. KNIGHT,
FRANCIS MILLWARD.